(12) United States Patent
Wu

(10) Patent No.: US 11,788,711 B1
(45) Date of Patent: Oct. 17, 2023

(54) DECORATIVE LIGHT BULB AND ITS PRODUCTION PROCESS

(71) Applicant: Qingbiao Wu, Fujian (CN)

(72) Inventor: Qingbiao Wu, Fujian (CN)

( * ) Notice: Subject to any disclaimer, the term of this patent is extended or adjusted under 35 U.S.C. 154(b) by 0 days.

(21) Appl. No.: 18/086,666

(22) Filed: Dec. 22, 2022

(51) Int. Cl.
| | |
|---|---|
| *F21V 17/16* | (2006.01) |
| *F21K 9/232* | (2016.01) |
| *F21V 23/00* | (2015.01) |
| *F21K 9/235* | (2016.01) |
| *F21K 9/90* | (2016.01) |
| *F21Y 103/10* | (2016.01) |
| *B23K 1/00* | (2006.01) |
| *B23K 101/36* | (2006.01) |

(52) U.S. Cl.
CPC .............. *F21V 17/16* (2013.01); *F21K 9/232* (2016.08); *F21K 9/235* (2016.08); *F21K 9/90* (2013.01); *F21V 23/002* (2013.01); *B23K 1/0016* (2013.01); *B23K 2101/36* (2018.08); *F21Y 2103/10* (2016.08)

(58) Field of Classification Search
CPC .. F21K 9/232; F21K 9/235; F21S 4/10; F21V 19/006
See application file for complete search history.

(56) References Cited

U.S. PATENT DOCUMENTS

| 1,189,044 | A | * | 6/1916 | Boden | F16M 11/28 |
| | | | | | 362/285 |
| 2,118,785 | A | * | 5/1938 | Birdseye | H01R 33/94 |
| | | | | | 439/6 |
| 10,718,471 | B1 | * | 7/2020 | Wu | F21K 9/238 |
| 2008/0089078 | A1 | * | 4/2008 | Wu | H01R 33/09 |
| | | | | | 362/382 |
| 2018/0372278 | A1 | * | 12/2018 | Zhang | F21K 9/237 |
| 2023/0047982 | A1 | * | 2/2023 | Wu | F21V 23/023 |

* cited by examiner

*Primary Examiner* — William N Harris

(57) ABSTRACT

An improved decorative light bulb, including a lampshade, a lamp holder, a light source component, a power supply component and a connecting structure; the lampshade includes a cover body and a mounting seat; the connective structure comprises a lampshade base, a lamp holder base and a connecting component; the lampshade base includes a first end and a second end; the mounting seat is detachably inserted in the first end, the lamp holder base is detachably inserted in the lamp holder, and the connecting component is detachably inserted in the second end; glue is filled in an accommodating space.

13 Claims, 5 Drawing Sheets

DECORATIVE LIGHT BULB AND ITS PRODUCTION PROCESS

FIELD OF THE INVENTION

The invention relates to the technical field of decorative lighting, in particular to an improved decorative light bulb and its production process.

BACKGROUND OF THE INVENTION

In recent years, the overall living standard has been improving. String lights of decorative light bulbs are not only seen in festival decorations, but are also more and more frequently used in business promotion or public space beautification, hence there is a greater demand for such products.

A Chinese patent document (Patent no.: CN215807988U) discloses a decorative light bulb, including a lampshade, a lamp holder, a light source component, a power supply component, a lampshade base and a lamp holder base. A mounting seat of the lampshade is inserted in the lampshade base, and the lamp holder base is inserted in the lamp holder. The power supply component includes wires, and the lampshade base and the lamp holder base are provided with through holes for the wires to pass through. In this patent, a connective structure is added between the lampshade and the lamp holder, and the wires connect the lampshade base and the lamp holder base. Users may adjust the lengths of the wires according to their own preferences, so that string lights of decorative light bulbs are suitable for more occasions.

In the above-mentioned decorative light bulb, waterproof sealing of the decorative light bulb requires more sealing structures between the light bulb and the connective structure, and between the lamp holder and the connective structure. The cost is relatively high, and the assembling method is too cumbersome for actual use.

In view of the disadvantages in the prior art, the Applicant conducted in-depth research on the above-mentioned problems and hereby submit this patent application.

BRIEF SUMMARY OF THE INVENTION

This invention provides an improved decorative light bulb, which is easier to use with simpler structure and lower production cost.

This invention adopts the following technical solution: An improved decorative light bulb, comprising a lampshade, a lamp holder, a connective structure connecting the lampshade and the lamp holder, and a light source component and a power supply component both provided in the lampshade and electrically connected with each other; the lampshade comprises a cover body and a mounting seat integrated with the cover body; the connective structure comprises a lampshade base, a lamp holder base and a connecting component which fixes the lampshade base with the lamp holder base; the lampshade base comprises a first end connected with the mounting seat, and a second end connected with the connecting component; the mounting seat is detachably inserted in the first end; the lamp holder base is detachably inserted in the lamp holder; the connecting component is detachably inserted in the second end of the lampshade base.

In a preferred embodiment, the connecting component is snap-fitted with the second end of the lampshade base.

In a preferred embodiment, the second end is provided with a through hole which allows the connecting component to pass through; an outer wall of the connecting component is provided with a groove; an inner wall of the through hole is provided with a bump corresponding to the groove, and the bump is fitted in the groove.

In a preferred embodiment, an inner end surface of the groove proximal to the lampshade, and an outer end surface of the bump proximal to the lampshade tilt downwards towards an axis of the lampshade.

In a preferred embodiment, an inner end surface of the groove 61 proximal to the lampshade, or an outer end surface of the bump proximal to the lampshade tilt downwards towards an axis of the lampshade.

In a preferred embodiment, the power supply component comprises a first wire and a second wire, the lamp holder base and the connecting component are provided with through holes allowing the first wire and the second wire to pass through; first connection ends of the first wire and the second wire pass through the through holes of the lamp holder base and connected to the lamp holder, while second connection ends of the first wire and the second wire pass through the through holes of the connecting component and electrically connected to the light source component.

In a preferred embodiment, an anti-rotation rib is provided at an outer side wall of the mounting seat along an axial direction of the lampshade; an interior of the first end of the lampshade base is provided with an anti-rotation groove corresponding to the anti-rotation rib; the anti-rotation rib is fitted in the anti-rotation groove.

In a preferred embodiment, the connecting component and the first wire and the second wire are integrally formed by injection molding.

In a preferred embodiment, a transparent seat is provided in the lampshade; the transparent seat is in interference fit with the mounting seat; the transparent seat is transparent and has a columnar shape; a diameter of the transparent seat gradually decreases along a direction away from the lamp holder; a side of the transparent seat proximal to the lamp holder is provided with hooks, which hook onto an end of the mounting seat.

In a preferred embodiment, the light source component comprises a transparent stem, a power board fixedly installed on the transparent seat, first rigid electrically-conductive strips inserted to the transparent stem, second rigid electrically-conductive strips inserted to the transparent stem and connected with the power board, and LED filaments fixedly connected between the first rigid electrically-conductive strips and the second rigid electrically-conductive strips; wherein, there are two said second rigid electrically-conductive strips; there are two or more said LED filaments, and the LED filaments are distributed evenly around the transparent stem; each of the second rigid electrically-conductive strips is connected with at least one of said LED filaments.

In a preferred embodiment, the two second rigid electrically-conductive strips pass through the power board and are connected with the first wire and the second wire respectively; a junction between each of the second rigid electrically-conductive strips and a corresponding wire is provided with a heat shrinkable sleeve.

In a preferred embodiment, an accommodating space in which glue is filled is provided between the transparent seat and the end of the mounting seat.

In a preferred embodiment, the mounting seat is fastened to the first end of the lampshade base or connected to the lampshade base by threaded connection; the lamp holder is connected with the lamp holder base by threaded connection.

The technical solution aforementioned has the following benefits:
1. The mounting seat is detachably inserted in the first end, the lamp holder base is detachably inserted in the lamp holder, the connecting component is detachably inserted in the second end, such that the components of the light bulb are fixedly assembled and connected via simple pulling, thereby enhancing the efficiency of producing the light bulb;
2. The mounting seat and the transparent seat are in interference fit and the transparent seat is fitted into the mounting seat of the lampshade by pressing into the mounting seat, such that it is well sealed between the transparent seat and the lampshade; this also prevents water from entering the light source component in the lampshade and enhances the overall waterproof level of the light bulb;
3. Fill the accommodating space with glue, which further enhances the waterproof performance of the light bulb.
4. Simple structure, lower production cost and easier to use.

This invention also provides a production process of the improved decorative light bulb which is simple in operation, manufactured at a lower cost, and achieves good waterproof effect.

The technical solution comprises the following steps:
S1: heating transparent plastic materials, and obtaining the lampshade by injection molding;
S2: heating transparent plastic materials, and obtaining the transparent seat of a desired shape by injection molding;
S3: mounting one end of each of the two second rigid electrically-conductive strips to the transparent seat; also installing the power board onto the transparent seat
S4: by reflow soldering, welding the two second rigid electrically-conductive strips on corresponding positions on the power board, and also by reflow soldering, welding the second connection ends of the first wire and the second wire with electrically-conductive portions of the second rigid electrically-conductive strips protruding from the power board;
S5: checking by visual inspection whether a surface of the power board is clean and whether the electrically-conductive portions of the second rigid electrically-conductive strips and the second connection ends are completely welded together and whether welding spots are full and intact; then using an AC120V60 HZ power supply and a testing probe to perform lighting test;
S6: placing the transparent seat obtained after step S5 into the mounting seat of the lampshade and pressing the transparent seat into the mounting seat to fit the transparent seat into the mounting seat; wherein the accommodating space is formed between the mounting seat and the transparent seat;
S7: dispensing a predetermined amount of glue into the accommodating space;
S8: protecting a welding junction between each second connection end and a corresponding electrically-conductive portion of a corresponding second rigid electrically-conductive strip protruding from the power board with the heat shrinkable sleeve; heating the heat shrinkable sleeve so that the heat shrinkable sleeve shrinks and attaches to the corresponding welding junction;
S9: passing the first connection ends of the first wire and the second wire respectively through the first through holes of the connecting component and the second through holes of the lamp holder base; pulling the first wire and the second wire towards the lamp holder such that the mounting seat of the lampshade is fastened to the first end of the lampshade base and the connecting component is in snap fit with the second end of the lampshade base;
S10: bending the first connection end of the first wire such that the first connection end presses against the external threads of the lamp holder base; passing the first connection end of the second wire out of a top end of the lamp holder, then threading the lamp holder and the lamp holder base together;
S11: performing tin soldering on the top end of the lamp holder;
S12: checking by visual inspection whether all components are connected as required and whether the lampshade contains any impurities inside; then using AC120V60 HZ power supply to test the light bulb.

The production process of this invention is simpler with a lower production cost.

DETAILED DESCRIPTION OF THE INVENTION

The technical solution in the embodiments of this invention will be clearly and completely described below with reference to the attached drawings. The described embodiments are illustrative only and do not represent all embodiments of this invention. Based on the embodiments of this invention, all other embodiments obtained by ordinary persons skilled in the art without inventive efforts shall also fall within the protection scope of this invention.

Figure 1:
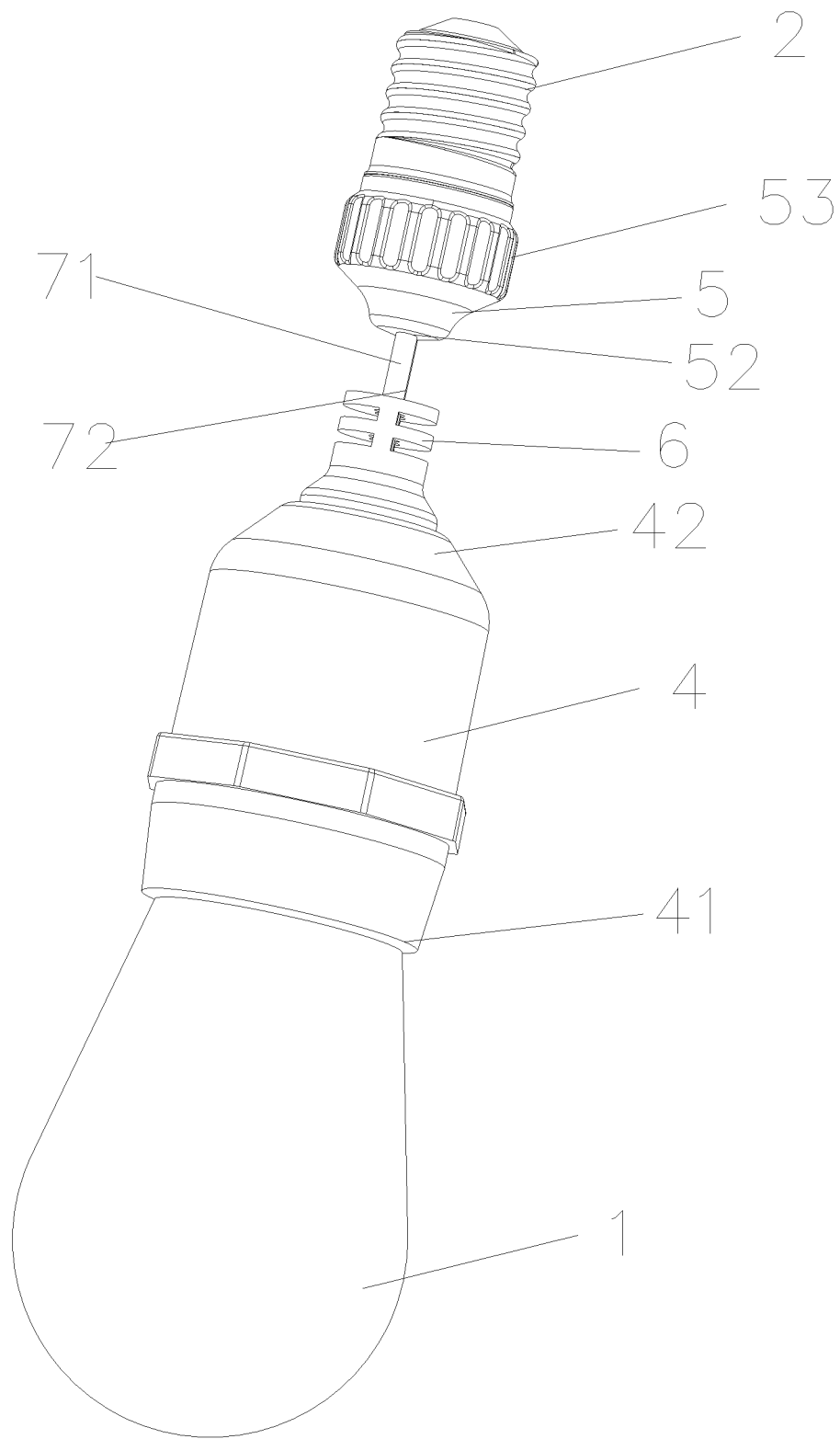
FIG. 1 is a schematic view of this invention.
Figure 2:
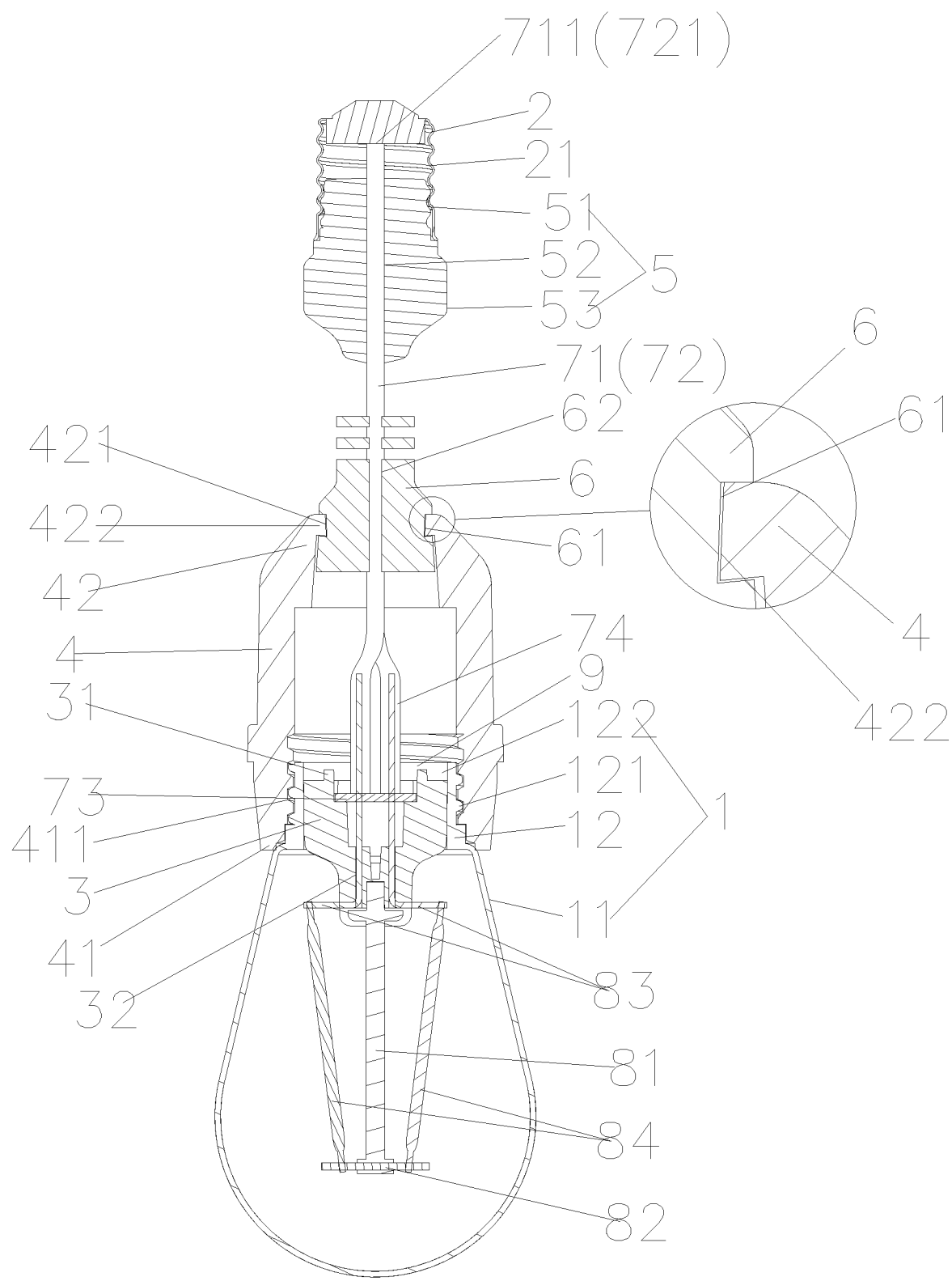
FIG. 2 is a cross-sectional view of this invention.
Figure 3:
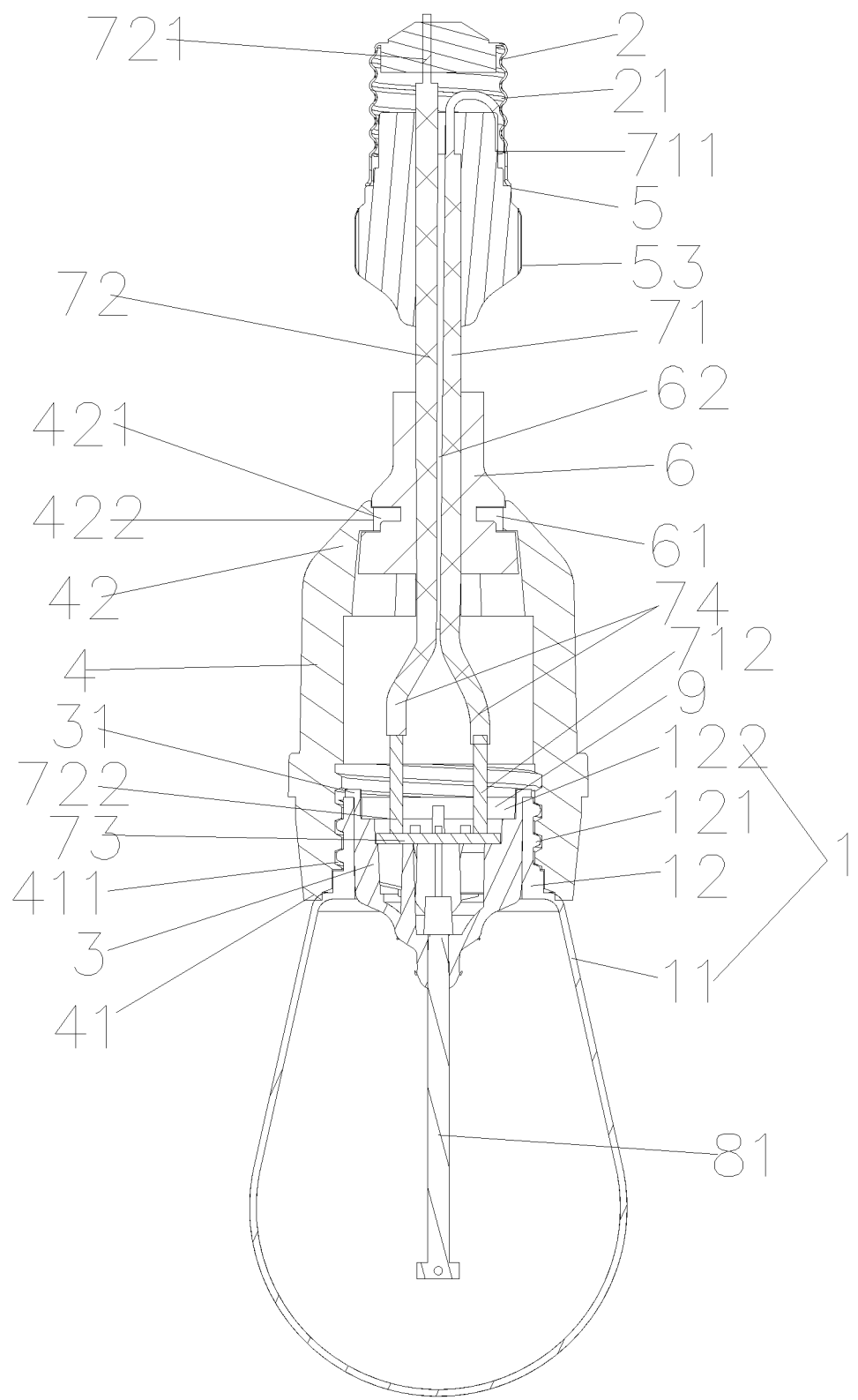
FIG. 3 is another cross-sectional view of this invention.
Figure 4:
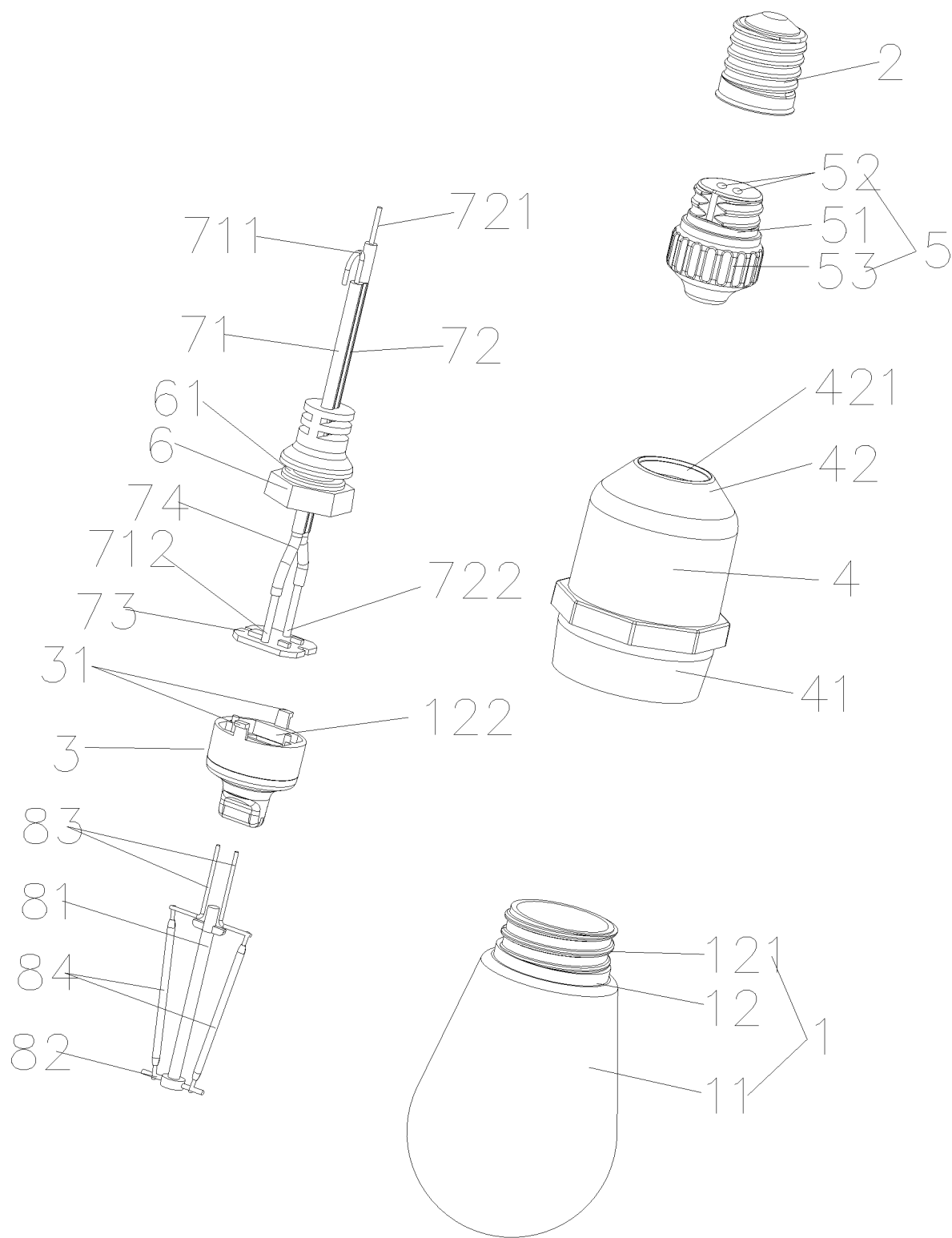
FIG. 4 is an exploded view of this invention.
Figure 5:
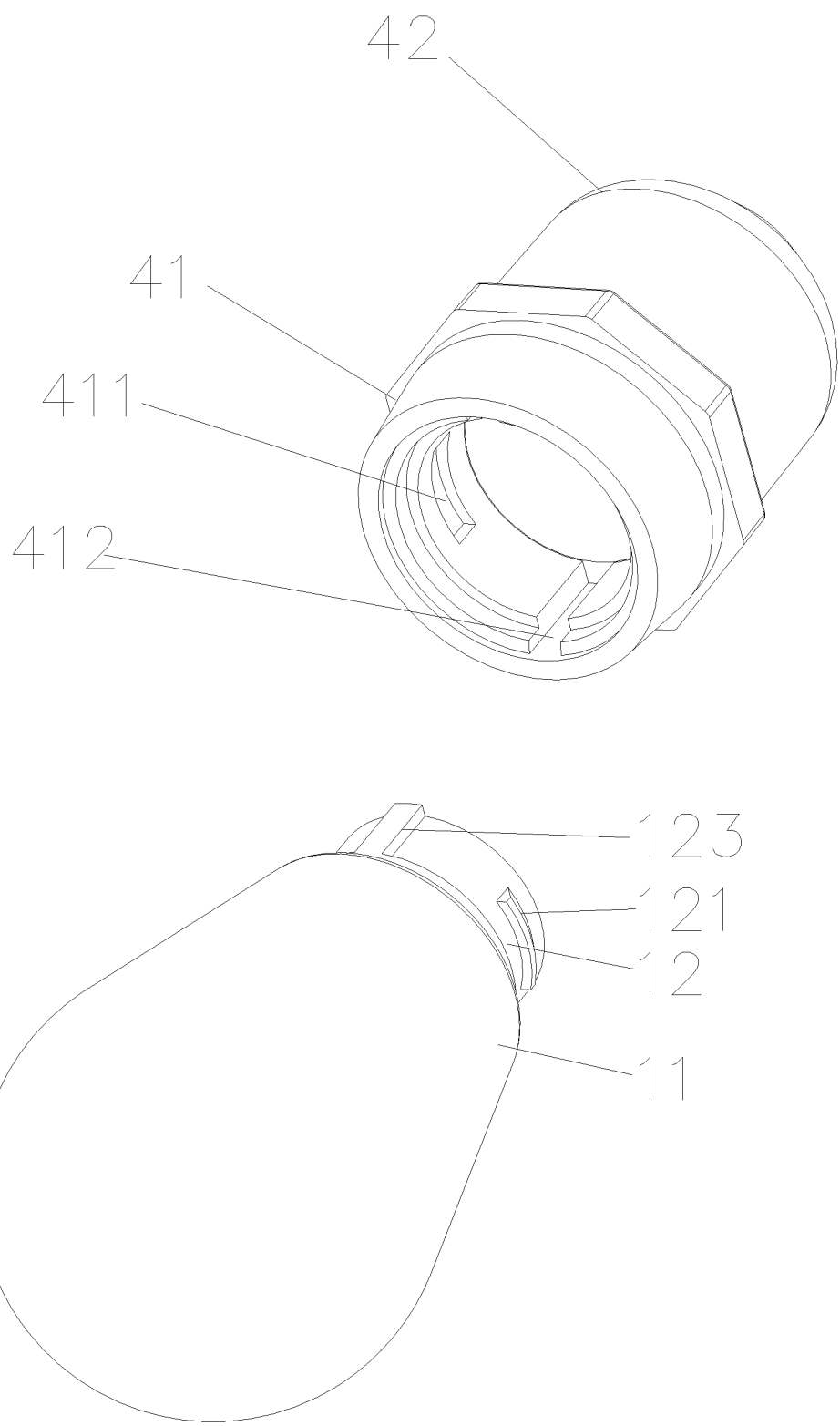
FIG. 5 is a schematic view of the lampshade and the lampshade base of this invention Denotations in the figures: lampshade 1, cover body 11, mounting seat 12, block 121, accommodating space 122, anti-rotation rib 123, lamp holder 2, internal threads 21, transparent seat 3, hooks 31, electrically-conductive strip holes 32, lampshade base 4, first end 41, slot 411, anti-rotation groove 412, second end 42, through hole 421, bump 422, lamp holder base 5, external threads 51, second through holes 52, clamping part 53, connecting component 6, groove 61, first through holes 62, first wire 71, first connection end 711 (of the first wire 71), second connection end 712 (of the first wire 71), second wire 72, first connection end 721 (of the second wire 72), second connection end 722 (of the second wire 72) power board 73, heat shrinkable sleeve 74, transparent stem 81, first rigid electrically-conductive strips 82, second rigid electrically-conductive strips 83, LED filaments 84, and glue 9.

According to FIG. 1 to FIG. 5:

An improved decorative light bulb, comprising a lampshade 1, a lamp holder 2, a connective structure connecting the lampshade 1 and the lamp holder 2, a light source component and a power supply component, both provided in the lampshade 1 and electrically connected with each other, and a transparent seat 3 inside the lampshade 1; the power supply component comprises a first wire 71, a second wire 72, and a power board 73 which is installed on the transparent seat 73.

The connective structure comprises a lampshade base 4, a lamp holder base 5 and a connecting component 6 which fixes the lampshade base 4 with the lamp holder base 5 via the first wire 71 and the second wire 72. The lampshade 1, transparent seat 3, the lampshade base 4, the lamp holder base 5 and the connecting component 6 are all made of plastic, such that this invention has a better drop-resistance; there is also no need to use open fire in the production process, as plastic components can be produced by blowing molding or injection molding.

The lampshade 1 comprises a cover body 11 and a mounting seat 12 integrated with the cover body 11; the transparent seat 3 is inserted into the mounting seat 12 via interference fit; the transparent seat 3 has a columnar shape and is transparent; a diameter of the transparent seat 3 gradually decreases along a direction away from the lamp holder 2; due to the interference fit between the transparent seat 3 and the mounting seat 12, the transparent seat 3 and the lampshade 1 is well sealed so that the light source component and the power supply component in the cover body 11 has a higher waterproof level, thereby the light bulb is more waterproof; besides, the transparent seat 3 is inserted into the mounting seat 12 via interference fit such that they are fixedly connected.

Furthermore, a side of the transparent seat 3 proximal to the lamp holder 2 is provided with hooks 31, which hook onto an end of the mounting seat 12, further enhancing the connection between the transparent seat 3 and the mounting seat 12.

The lampshade base 4 comprises a first end 41 connected with the mounting seat 12, and a second end 42 connected with the connecting component 6; the mounting seat 12 is detachably inserted in the first end 41, and the lamp holder base 5 is detachably inserted in the lamp holder 2. Wherein, the cover body 11 of the lampshade 1, not inserted in the first end 41, has a shape same as a traditional incandescent lamp, and the shape may also be designed according to actual needs. When the lampshade 1 is molded by injection, a block 121 is formed at an outer side wall of the mounting seat 12; an interior of the first end 41 is provided with a slot 411 corresponding to the block 121; the lampshade 1 and the lampshade base 4 are locked by fastening the block 121 with the slot 411 to prevent the lampshade 1 and the lampshade base 4 from moving along an axial direction, in other words, to prevent the lampshade base 4 from being pulled away from the lampshade 1 during assembly. Other connection methods may also be adopted in this invention, for example, the mounting seat 12 of the lampshade 1 and the first end 41 of the lampshade base 4 are connected by threads. Various methods, not described herein, may be adopted as long as the lampshade 1 and the lampshade base 4 are connected.

An anti-rotation rib 123 is provided at the outer side wall of the mounting seat 12 along an axial direction of the lampshade 1; the interior of the first end 41 is provided with an anti-rotation groove 412 corresponding to the anti-rotation rib 123; the anti-rotation rib 123 is fitted in the anti-rotation groove 412 to prevent rotation between the lampshade 1 and the lampshade base 4. The block 121 and the slot 411 cooperatively provided, as well as the anti-rotation rib 123 and the anti-rotation groove 412 cooperatively provided not only limit the movement of the lampshade 1 and the lampshade base 4 along the axial direction of the lampshade, but also limit the rotation between them, thereby achieving fixation between the lampshade 1 and the lampshade base 4.

The lamp holder base 5 is detachably inserted in the lamp holder 2, and the lamp holder 2 is connected with the lamp holder base 5 via threads or snap-fit; the lamp holder 2 is a threaded head commonly used in a traditional incandescent lamp, and is usually formed by die casting, hence internal threads 21 are formed in the lamp holder 2 when external threads are formed on the outside; external threads 51 fitting with the internal threads 21 of the lamp holder 2 is provided on the lamp holder base 5; the lamp holder 2 and the lamp holder base 5 are locked together by threads. Other connection methods may also be adopted in this invention, for example, the lamp holder 2 and the lamp holder base 5 may be connected by snap-fit. Various methods, not described herein, may be adopted as long as the lamp holder 2 and the lamp holder base 5 are connected.

The connecting component 6 is detachably inserted in the second end 42 of the lampshade base 4 via snap-fit. In a preferable embodiment, the second end 42 is provided with a through hole 421 which allows the connecting component 6 to pass through; an outer wall of the connecting component 6 is provided with a groove 61; an inner wall of the through hole 421 is provided with a bump 422 correspondingly to the groove 61, and thus the bump 422 is fitted in the groove 61. Via connection between the bump 422 and the groove 61, the connecting component 6 and the lampshade base 4 are connected. Furthermore, an inner end surface of the groove 61 proximal to the lampshade 1, and/or an outer end surface of the bump 422 proximal to the lampshade 1 tilt downwards towards the axis of the lampshade 1 for position limiting purpose. This design prevents the connecting component 6 from being over-pulled and detaching from the lampshade base 4. Other connection methods may also be adopted in this invention, for example, the connecting component 6 and the second end 42 may be connected by threads. Various methods, not described herein, may be adopted as long as the connecting component 6 and the second end 42 are connected.

The light source component comprises a transparent stem 81, first rigid electrically-conductive strips 82 inserted to the transparent stem 81, second rigid electrically-conductive strips 83 inserted to the transparent stem 81 and connected with the power board 73, and LED filaments 84 fixedly connected between the first rigid electrically-conductive strips 82 and the second rigid electrically-conductive strips 83; specifically, there are two second rigid electrically-conductive strips 83. A connecting method of the transparent stem 81, the first rigid electrically-conductive strips 82, the second rigid electrically-conductive strips 83, the LED filaments 84 and the transparent seat 3 are not described herein, as the method is already described in the Chinese patent document no. CN209762751 U. Other light source component apart from the aforementioned may be adopted and will not be described herein.

The first wire 71 and the second wire 72 each includes a first connection end 711/721 connected to a power supply and a second connection end 712/722 connected to the power board 73. It should be noted that the first connecting end 711 of the first wire 71 can be connected to a neutral wire of the utility power, and the first connecting end 711 of the second wire 72 can be connected to a live wire of the utility power.

Furthermore, the two second rigid electrically-conductive strips 83 pass through the power board 73 and are respectively electrically connected with the second connection end 712 of the first wire 71 and the second connection end 722 of the second wire 72; each junction is provide with a heat shrinkable sleeve 74 to wrap the junction to prevent electrical leakage and enhance waterproof performance.

The connecting component 6 is provided with first through holes 62 for the first wire 71 and the second wire 72 to pass through, and each second connection end 712/722 of each wire passes through the respective first through hole 62 and is connected to the power board 73; second through holes 52 are provided on the lamp holder base 5 for the first wire 71 and the second wire 72 to pass through, and each first connection end 711/721 of the two wires passes through the respective second through hole 52 and is connected to the lamp holder 2. In the embodiment, the connecting component 6, the first wire 71 and the second wire 72 may be integrally formed by injection molding, and each second connection end 712/722 of the two wires is directly connected to the power board 73.

A peripheral surface of the lamp holder base 5 proximal to the lampshade 1 is also provided with a clamping part 53 for clamping by hand or clamping and rotating by a robotic arm.

An accommodating space 122 is provided between the transparent seat 3 and an end of the mounting seat 12 such that the accommodating space 122 is filled with glue 9 to seal the transparent seat 3 and the mounting seat 12 for better waterproof performance.

When using, install the two second rigid electrically-conductive strips 83 and the power board 73 on respective positions on the transparent seat 3; by reflow soldering, weld the two second rigid electrically-conductive strips 83 onto the power board 73; weld the second connection end 712/722 of each wire with a portion of each of the second rigid electrically-conductive strips 83 protruding from the power board 73; place the assembled transparent seat 3 in the mounting seat 12 of the lampshade 1 and press the assembled transparent seat 3 to fit in to the mounting seat 12; add appropriate amount of glue 9 into the accommodating space 122 of the mounting seat 12 for waterproof sealing; connect each second connection end 712/722 with a corresponding second rigid electrically-conductive strip 83 and protect each junction with the heat shrinkable sleeve 74 which is heated and adheres to each junction; pull the first wire 71 and the second wire 72 towards the lamp holder 2 such that the mounting seat 12 of the lampshade 1 is fastened to the first end 41 of the lampshade base 4 and the connecting component 6 is in snap fit with the second end 42 of the lampshade base 4. This invention provides a sealed and waterproof decorative light bulb in a simpler structure with an easier assembling method.

The technical solution aforementioned has the following benefits:
1. The mounting seat 12 is detachably inserted in the first end 41, the lamp holder base 5 is detachably inserted in the lamp holder 2, the connecting component 6 is detachably inserted in the second end 42, such that the components of the light bulb are fixedly assembled and connected via simple pulling, thereby enhancing the efficiency of producing the light bulb;
2. The mounting seat 12 and the transparent seat 3 are in interference fit and the transparent seat 3 is fitted into the mounting seat of the lampshade 1 by pressing into the mounting seat 12, such that it is well sealed between the transparent seat 3 and the lampshade 1; this also prevents water from entering the light source component in the lampshade 1 and enhances the overall waterproof level of the light bulb;
3. Fill the accommodating space 122 with glue 9, which further enhances the waterproof performance of the light bulb.

A production process of the aforementioned improved decorative light bulb is also provided according an embodiment of the present invention, the method comprises the following steps:
S1: Heating transparent plastic materials by an industrial injection molding machine, and injecting the transparent plastic materials into a lampshade mold to obtain the lampshade 1;
S2: Heating transparent plastic materials by the industrial injection molding machine, and injecting the transparent plastic materials into a transparent seat mold to obtain the transparent seat 3 of a predetermined shape; wherein the hooks 31 and electrically-conductive strip holes 32 which the two second rigid electrically-conductive strips 83 pass through are also formed during injection molding of the transparent seat 3;
S3: Passing one end of each of the two second rigid electrically-conductive strips 83 through a corresponding electrically-conductive strip hole 32 so as to install the two second rigid electrically-conductive strips 83 to the transparent seat 3; also installing the power board 73 onto the transparent seat 3;
S4: By reflow soldering, welding the two second rigid electrically-conductive strips 83 on corresponding positions on the power board 73, and welding the second connection ends 712/722 of the first wire 71 and the second wire 72 with electrically-conductive portions of the second rigid electrically-conductive strips 83 protruding from the power board 73;
S5: Checking by visual inspection whether a surface of the power board 73 is clean and whether the electrically-conductive portions of the second rigid electrically-conductive strips 83 and the second connection ends 712/722 are completely welded together and whether welding spots are full and intact; then using an AC120V60 HZ power supply and a testing probe for lighting test;
S6: Placing the transparent seat 3 obtained after step S5 into the mounting seat 12 of the lampshade 1 and pressing the transparent seat 3 into the mounting seat 12 to fit the transparent seat 3 into the mounting seat 12; wherein the hooks 31 are hooked to an end surface of the mounting seat 12, and the accommodating space 122 is formed between the mounting seat 12 and the transparent seat 3;
S7: Placing the lampshade 1 onto a glue dispensing workbench; aligning a glue dispenser with the accommodating space 122 of the mounting seat 12 for glue dispensing; and dispensing a predetermined amount of glue 9;
S8: Protecting a welding junction between each second connection end 712/722 and the corresponding electrically-conductive portion of the corresponding second rigid electrically-conductive strip 83 protruding from the power board 73 with the heat shrinkable sleeve 74; heating the heat shrinkable sleeve 74 so that the heat shrinkable sleeve 74 shrinks and attaches to the corresponding welding junction;
S9: Passing the first connection ends 711/721 of the first wire 71 and the second wire 72 respectively through the first through holes 62 of the connecting component 6 and the second through holes 52 of the lamp holder base 5; pulling the first wire 71 and the second wire 72 towards the lamp holder 2 such that the mounting seat 12 of the lampshade 1 is fastened to the first end 41 of the lampshade base 4 and the connecting component 6 is in snap fit with the second end 42 of the lampshade base 4; it should be also noted that, the connecting component 6, the first wire 71 and the second wire 72 may be integrally formed by injection molding and then passing the first wire 71 and the second wire 72 integrally formed with the connecting component 6 through the second through holes 52 of the lamp holder base 5; then, pulling the first wire 71 and the second wire 72 towards the lamp holder 2 such that the mounting seat 12 of the lampshade 1 is fastened to the first end 41 of the lampshade base 4 and the connecting component 6 is in snap fit with the second end 42 of the lampshade base 4;

S10: Bending the first connection end 711 of the first wire 71 such that the first connection end 711 presses against the external threads 51 of the lamp holder base 5; passing the first connection end 721 of the second wire 72 through a pad hole 21 on top of the lamp holder 2, then threading the lamp holder 2 and the lamp holder base 5 together;

S11: Performing tin soldering on the pad hole 21 on the top of the lamp holder 2 to acquire an arc-shaped soldering point smooth and free of burrs on the pad hole;

S12: Checking by visual inspection whether all components are connected as required and whether the lampshade 1 contains any impurities inside; then using AC120V60 HZ power supply to test the light bulb.

This technical solution provides a simpler production process with lower production cost.

The embodiments of the present invention shown and described herein are illustrative only. Changes, modifications and substitutions can be made to these embodiments by those skilled in the art without departing from the principle and spirit of this invention and shall fall within the scope of this invention as defined by the appended claims.

What is claimed is:

1. A decorative light bulb, comprising a lampshade, a lamp holder, a connective structure connecting the lampshade and the lamp holder, and a fight source component and a power supply component both provided in the lampshade and electrically connected with each other; the lampshade comprises a cover body and a mounting seat integrated with the cover body; the connective structure comprises a lampshade base, a lamp holder base and a connecting component which fixes the lampshade base with the lamp holder bass; the lampshade base comprises a first end connected with the mounting seat, and a second end connected with the connecting component; the mounting seat is detachably inserted in the first end; the lamp holder base is detachably inserted in the lamp holder; the connecting component is detachably inserted in the second end of the lampshade base; the connecting component is snap-fitted with the second end of the lampshade base.

2. The decorative light bulb of claim 1, wherein the second end is provided with a through hole which allows the connecting component to pass through; an outer wall of the connecting component is provided with a groove; an inner wall of the through hole is provided with a bump corresponding to the groove, and the bump is fitted in the groove.

3. The decorative light bulb of claim 2, wherein an inner end surface of the groove proximal to the lampshade, and an outer end surface of the bump proximal to the lampshade tilt downwards towards an axis of the lampshade.

4. The decorative light bulb of claim 2, wherein an inner end surface of the groove proximal to the lampshade, or an outer and surface of the bump proximal to the lampshade tilt downwards towards an axis of the lampshade.

5. The decorative light bulb of claim 1, wherein an anti-rotation rib is provided at an outer side wall of the mounting seat along an axial direction of the lampshade; an interior of the first end of the lampshade base is provided with an anti-rotation groove corresponding to the anti-rotation rib; the anti-rotation rib is fitted in the anti-rotation groove.

6. The decorative light bulb of claim 1, wherein the power supply component comprises a first wire and a second wire, the lamp holder base and the connecting component are provided with through holes allowing the first wire and the second wire to pass through; first connection ends of the first wire and the second wire pass through the through holes of the lamp holder base and are connected to the lamp holder, while second connection ends of the first wire and the second wire pass through the through holes of the connecting component and are electrically connected to the light source component.

7. The decorative light bulb of claim 6, wherein the connecting component and the first wire and the second wire are integrally formed by injection molding.

8. The decorative light bulb of claim 6, wherein a transparent seat is provided in the lampshade; the transparent seat is in interference fit with the mounting seat; the transparent seat is transparent and has a columnar shape; a diameter of the transparent seat gradually decreases along a direction away from the lamp holder; a side of the transparent seat proximal to the lamp holder is provided with hooks, which hook onto an end of the mounting seat.

9. The decorative light bulb of claim 8, wherein the light source component comprises a transparent stem, a power board fixedly installed on the transparent seat, first rigid electrically-conductive strips inserted to the transparent stem, second rigid electrically-conductive strips inserted to the transparent stem and connected with the power board, and LED filaments fixedly connected between the first rigid electrically-conductive strips and the second rigid electrically-conductive strips; wherein, there are two said second rigid electrically-conductive strips; there are two or more said LED filaments, and the LED filaments are distributed evenly around the transparent stem; each of the second rigid electrically-conductive strips is connected with at least one of said LED filaments.

10. The decorative light bulb of claim 9, wherein the two second rigid electrically-conductive strips pass through the power board and are connected with the first wire and the second wire respectively; a junction between each of the second rigid electrically-conductive strips and a corresponding wire is provided with a heat shrinkable sleeve.

11. The decorative light bulb of claim 8, wherein an accommodating space in which glue is filled is provided between the transparent seat and the end of the mounting seat.

12. The decorative light bulb of claim 1, wherein the mounting seat is fastened to the first end of the lampshade base or connected to the lampshade base by threaded connection; the lamp holder is connected with the lamp holder base by threaded connection.

13. A production method of a decorative light bulb of claim 10, comprising the following steps:
S1: heating transparent plastic materials, and then obtaining the lampshade by injection molding;
S2: heating transparent plastic materials, and then obtaining the transparent seat of a desired shape by injection molding;

S3: mounting one end of each of the two second rigid electrically-conductive strips to the transparent seat; also installing the power board onto the transparent seat;

S4: by reflow soldering, welding the two second rigid electrically-conductive strips on corresponding positions on the power board, and also by reflow soldering, welding the second connection ends of the first wire and the second wire with electrically-conductive portions of the second rigid electrically-conductive strips protruding from the power board;

S5: checking by visual inspection whether a surface of the power board is clean and whether the electrically-conductive portions of the second rigid electrically-conductive strips and the second connection ends are completely welded together and whether welding spots are full and intact; then using an AC120V60 HZ power supply and a testing probe to perform lighting test;

S6: placing the transparent seat obtained after step S5 into the mounting seat of the lampshade and pressing the transparent seat into the mounting seat to fit the transparent seat into the mounting seat; wherein an accommodating space is formed between the mounting seat and the transparent seat;

S7: dispensing a predetermined amount of glue into the accommodating space;

S8: protecting a welding junction between each second connection end and a corresponding electrically-conductive portion of a corresponding second rigid electrically-conductive strip protruding from the power board with the heat shrinkable sleeve; heating the heat shrinkable sleeve so that the heat shrinkable sleeve shrinks and attaches to the corresponding welding junction;

S9: passing the first connection ends of the first wire and the second wire respectively through the first through holes of the connecting component and the second through holes of the lamp holder base; pulling the first wire and the second wire towards the lamp holder such that the mounting seat of the lampshade is fastened to the first end of the lampshade base and the connecting component is in snap fit with the second end of the lampshade base;

S10: bending the first connection end of the first wire such that the first connection end presses against external threads of the lamp holder base; passing the first connection and of the second wire out of a top end of the lamp holder, then threading the lamp holder and the lamp holder base together;

S11: performing tin soldering on the top end of the lamp holder;

S12: checking by visual inspection whether all components are connected as required and whether the lampshade contains any impurities inside; then using an AC120V60 HZ power supply to test the decorative light bulb.

* * * * *